(12) United States Patent
Jaisinghani et al.

(10) Patent No.: US 10,348,642 B2
(45) Date of Patent: *Jul. 9, 2019

(54) CUSTOM RESOURCES IN A RESOURCE STACK

(71) Applicant: Amazon Technologies, Inc., Seattle, WA (US)

(72) Inventors: Avinash Jaisinghani, Seattle, WA (US); Reto Kramer, Sammamish, WA (US); Prashant Jayaraman, Bothell, WA (US); Christopher Whitaker, Sammamish, WA (US); Venkates Paramasivam Balakrishnan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,238

(22) Filed: Mar. 26, 2018

(65) Prior Publication Data

US 2018/0212898 A1 Jul. 26, 2018

Related U.S. Application Data

(63) Continuation of application No. 14/739,774, filed on Jun. 15, 2015, now Pat. No. 9,929,974, which is a (Continued)

(51) Int. Cl.
*G06F 15/177* (2006.01)
*H04L 12/911* (2013.01)
(Continued)

(52) U.S. Cl.
CPC .......... *H04L 47/827* (2013.01); *G06F 9/5061* (2013.01); *H04L 29/08072* (2013.01); *H04L 41/0806* (2013.01)

(58) Field of Classification Search
CPC ............ H04L 47/827; H04L 29/08072; H04L 41/0806; G06F 9/5061
See application file for complete search history.

(56) References Cited

U.S. PATENT DOCUMENTS

| | | | |
|---|---|---|---|
| 6,389,540 B1 | 5/2002 | Scheifler et al. | |
| 6,766,364 B2 | 7/2004 | Moyer et al. | |

(Continued)

FOREIGN PATENT DOCUMENTS

| | | |
|---|---|---|
| EP | 1631019 | 3/2006 |
| EP | 2439687 | 4/2012 |

(Continued)

*Primary Examiner* — Razu A Miah
(74) *Attorney, Agent, or Firm* — Robert C. Kowert; Meyertons, Hood, Kivlin, Kowert & Goetzel, P.C.

(57) ABSTRACT

A resource stack managed by a resource stack provider is created based on a resource stack template that integrates a custom resource from a second provider into the resource stack using a notification system with the second provider. For example, a customer may create a template that defines a resource stack that comprises resources available from the resource stack provider and one or more custom resources provided by a second provider. When a resource stack is created, resources available from the resource stack provider may be provisioned. Custom resources may be initialized by notifying the provider of the custom resource of the requested integration of the custom resource with the resource stack and requested configuration details. The custom resource provider may respond with an indication of successful integration when the custom resource has been successfully initialized. After initializing the resources, the resource stack may be enabled for use.

21 Claims, 7 Drawing Sheets

Related U.S. Application Data continuation of application No. 13/668,151, filed on Nov. 2, 2012, now Pat. No. 9,058,219.

(51) Int. Cl.
*G06F 9/50* (2006.01)
*H04L 29/08* (2006.01)
*H04L 12/24* (2006.01)

(56) References Cited

U.S. PATENT DOCUMENTS

| | | |
|---|---|---|
| 7,246,200 B1 | 7/2007 | van Rietschote et al. |
| 7,290,164 B1 | 10/2007 | Harvey et al. |
| 7,457,853 B1 | 11/2008 | Chari et al. |
| 7,596,620 B1 | 9/2009 | Colton et al. |
| 7,844,903 B2 | 11/2010 | Dawkins et al. |
| 7,849,472 B1 | 12/2010 | Fuchs |
| 7,873,960 B2 | 1/2011 | Templin et al. |
| 7,904,333 B1* | 3/2011 | Perkowski ............ G06Q 30/02 705/14.4 |
| 8,326,658 B1 | 12/2012 | Lee et al. |
| 8,331,362 B2 | 12/2012 | Shukla et al. |
| 8,825,817 B1 | 9/2014 | Jaisinghani et al. |
| 9,058,219 B2 | 6/2015 | Jaisinghani et al. |
| 9,929,974 B2 | 3/2018 | Jaisinghani et al. |
| 2002/0087734 A1 | 7/2002 | Marshall et al. |
| 2002/0120741 A1 | 8/2002 | Webb et al. |
| 2002/0152305 A1 | 10/2002 | Jackson et al. |
| 2002/0194081 A1* | 12/2002 | Perkowski ............ G06Q 30/02 705/26.1 |
| 2002/0194251 A1 | 12/2002 | Richter et al. |
| 2003/0046396 A1 | 3/2003 | Richter et al. |
| 2003/0204634 A1 | 10/2003 | Pinkerton et al. |
| 2004/0186905 A1 | 9/2004 | Young et al. |
| 2004/0210479 A1 | 10/2004 | Perkowski et al. |
| 2004/0215780 A1 | 10/2004 | Kawato |
| 2004/0243699 A1 | 12/2004 | Koclanes et al. |
| 2005/0021688 A1 | 1/2005 | Felts et al. |
| 2005/0044188 A1 | 2/2005 | Nakazawa et al. |
| 2005/0071472 A1 | 3/2005 | Arndt et al. |
| 2006/0050862 A1 | 3/2006 | Shen et al. |
| 2006/0075102 A1 | 4/2006 | Cupit |
| 2006/0080592 A1 | 4/2006 | Alves de Moura et al. |
| 2006/0111089 A1 | 5/2006 | Winter et al. |
| 2006/0195575 A1 | 8/2006 | Delany et al. |
| 2006/0212332 A1 | 9/2006 | Jackson |
| 2006/0230149 A1* | 10/2006 | Jackson ............... G06F 9/5027 709/226 |
| 2007/0016897 A1 | 1/2007 | Todd |
| 2007/0112574 A1 | 5/2007 | Greene |
| 2007/0143398 A1* | 6/2007 | Graham ............... G06Q 40/02 709/204 |
| 2007/0180447 A1 | 8/2007 | Mazzaferri et al. |
| 2007/0233827 A1 | 10/2007 | McKnight |
| 2007/0260712 A1 | 11/2007 | Jibbe |
| 2008/0052719 A1* | 2/2008 | Briscoe ............... H04L 41/0806 718/104 |
| 2008/0163171 A1 | 7/2008 | Chess et al. |
| 2008/0189402 A1 | 8/2008 | Betzler et al. |
| 2008/0288239 A1 | 11/2008 | Bailey et al. |
| 2009/0006416 A1* | 1/2009 | Krahulec .......... G06F 17/30893 |
| 2009/0022097 A1 | 1/2009 | Yoon et al. |
| 2009/0064135 A1 | 3/2009 | Jimmerson |
| 2009/0077090 A1 | 3/2009 | Pacifici et al. |
| 2009/0119773 A1* | 5/2009 | D'Amore ............. G06F 9/5011 726/21 |
| 2009/0217287 A1 | 8/2009 | Blum et al. |
| 2009/0287837 A1* | 11/2009 | Felsher ................ G06F 19/328 709/229 |
| 2009/0327112 A1 | 12/2009 | Li et al. |
| 2010/0005529 A1 | 1/2010 | Hemade |
| 2010/0023934 A1 | 1/2010 | Sheehan et al. |
| 2010/0037287 A1 | 2/2010 | Netrakanti et al. |
| 2010/0050173 A1 | 2/2010 | Hensbergen |
| 2010/0131324 A1 | 5/2010 | Ferris |
| 2010/0131624 A1 | 5/2010 | Ferris |
| 2010/0131625 A1 | 5/2010 | Dehaan et al. |
| 2010/0154024 A1 | 6/2010 | Boxmeyer et al. |
| 2010/0165876 A1 | 7/2010 | Shukla et al. |
| 2010/0235285 A1* | 9/2010 | Hoffberg ............ G06Q 20/401 705/75 |
| 2010/0263042 A1* | 10/2010 | Zhang ................... H04L 61/10 726/15 |
| 2010/0280959 A1 | 11/2010 | Stone et al. |
| 2010/0293269 A1* | 11/2010 | Wilson ................ G06F 9/5061 709/224 |
| 2010/0318658 A1 | 12/2010 | Zorn et al. |
| 2011/0055395 A1 | 3/2011 | Wang et al. |
| 2011/0138047 A1 | 6/2011 | Brown et al. |
| 2011/0179422 A1 | 7/2011 | Stegaru et al. |
| 2011/0225467 A1 | 9/2011 | Betzler et al. |
| 2011/0258621 A1 | 10/2011 | Kern |
| 2011/0296020 A1 | 12/2011 | Deng et al. |
| 2011/0320574 A1 | 12/2011 | Felts |
| 2011/0320605 A1* | 12/2011 | Kramer ............... H04L 41/0843 709/226 |
| 2012/0147894 A1 | 6/2012 | Mulligan et al. |
| 2012/0179808 A1 | 7/2012 | Bergkvist et al. |
| 2012/0233333 A1 | 9/2012 | Ganesan et al. |
| 2012/0246630 A1 | 9/2012 | Kuzins et al. |
| 2012/0303740 A1 | 11/2012 | Ferris |
| 2013/0018994 A1 | 1/2013 | Flavel et al. |
| 2013/0041852 A1* | 2/2013 | Ellis ..................... G06Q 50/06 705/412 |
| 2013/0097651 A1 | 4/2013 | Rendahl et al. |
| 2013/0124807 A1 | 5/2013 | Nielsen et al. |
| 2013/0151710 A1 | 6/2013 | D'souza et al. |
| 2013/0159380 A1 | 6/2013 | Alam et al. |
| 2013/0167211 A1 | 6/2013 | Kamat |
| 2013/0212183 A1 | 8/2013 | Ward |
| 2013/0232480 A1 | 9/2013 | Winterfeldt et al. |
| 2013/0232498 A1 | 9/2013 | Mangtani et al. |
| 2013/0283273 A1 | 10/2013 | Miyazaki |
| 2014/0149980 A1 | 5/2014 | Vittal et al. |
| 2014/0181296 A1 | 6/2014 | Lee et al. |
| 2014/0282529 A1 | 9/2014 | Bugenhagen |

FOREIGN PATENT DOCUMENTS

| | | |
|---|---|---|
| FR | 2851870 | 9/2004 |
| JP | 2004086769 | 3/2004 |
| JP | 2005056201 | 3/2005 |
| JP | 2005266917 | 9/2005 |
| JP | 2007193696 | 8/2007 |
| JP | 2009217321 | 9/2009 |
| JP | 2010140403 | 6/2010 |
| JP | 2012501021 | 1/2012 |
| WO | 2010023139 | 3/2010 |

* cited by examiner

CUSTOM RESOURCES IN A RESOURCE STACK

This application is a continuation of U.S. patent application Ser. No. 14/739,774, Filed Jun. 15, 2015, now U.S. Pat. No. 9,929,974, which is a continuation of U.S. patent application Ser. No. 13/668,151, filed Nov. 2, 2012, now U.S. Pat. No. 9,058,219, which are hereby incorporated by reference in their entirety.

BACKGROUND

Organizations may utilize various computing resources in support of their operations. Computing include various types of resources, such as computing resources, data storage resources, and network resources. Computing resources are often also provided as a service. A provider of such services may provide access to a machine to host an application, storage to store application data, cache to quickly respond to repeated data requests and networking to enable communication between resources. The resources may be physically hosted in a data center (or multiple data centers and remotely and programmatically managed by others. By making use of the data center services, a customer may pay for computing and/or resource use from a provider rather than purchasing anticipated hardware needs. This enables a customer to expand and contract use of computing services according to demand. For example, an application may be configured to request more storage as needed rather than a developer or administrator monitoring and anticipating use. This on-demand infrastructure model can be referred to as Infrastructure as a Service (IaaS). A collection of resources in an IaaS model is often referred to as a resource stack.

Other provider models include Platform as a Service (PaaS) and Software as a Service (SaaS). In a PaaS model, a provider provides an execution environment in which a developer may construct an application. For example, a provider may provide an operating system, programming language execution environment, database and webserver in which a customer may construct a web application. In a SaaS model, a provider provides an application that may be accessed by a customer. For example, a customer may only see a single interface to the application, but the SaaS provider may scale the application dynamically to meet client demands.

BRIEF DESCRIPTION OF THE DRAWINGS

Various embodiments in accordance with the present disclosure will be described with reference to the drawings, in which.

DETAILED DESCRIPTION

Figure 1:
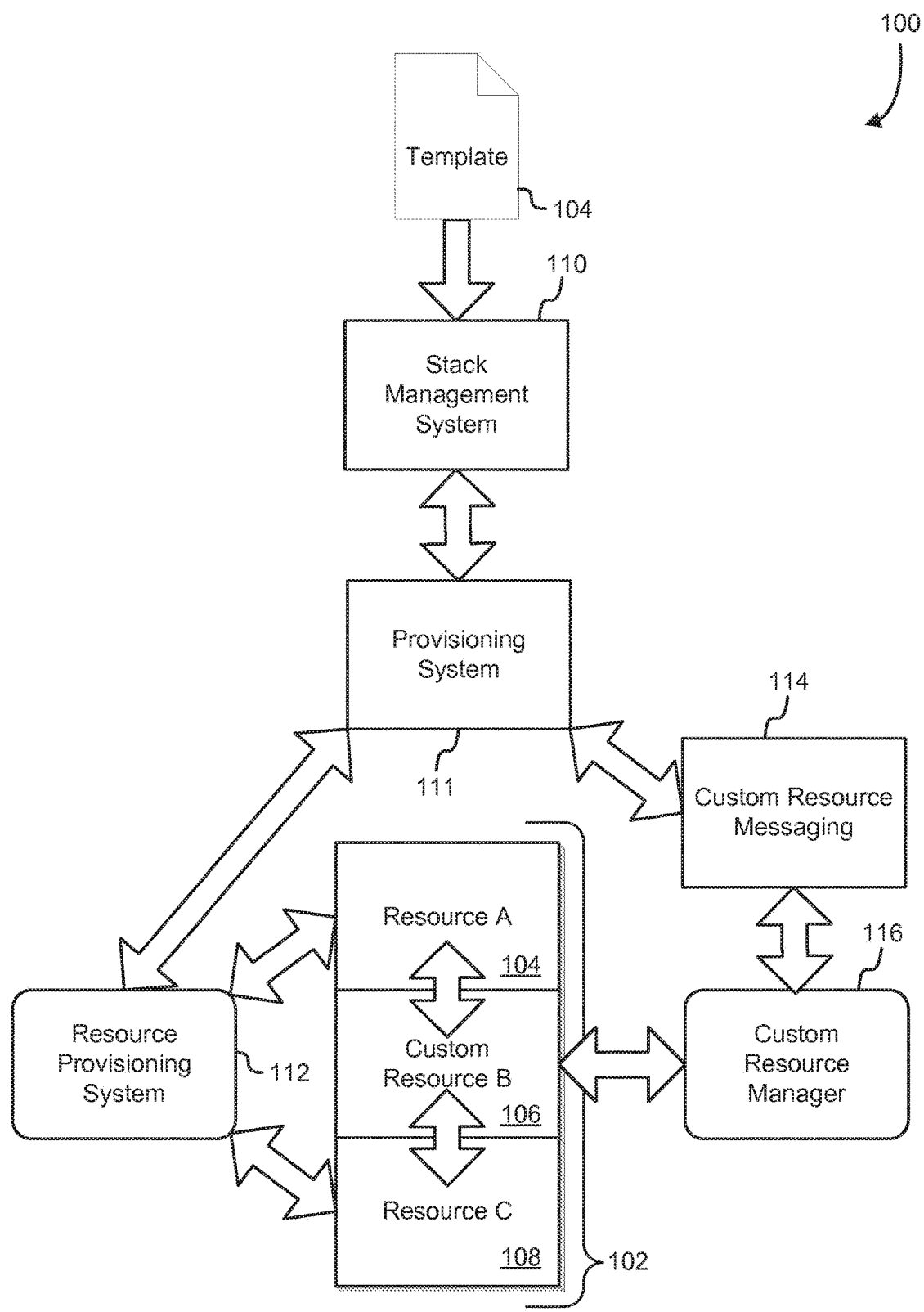
FIG. 1 shows an illustrative example of a system with a resource stack in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include creating a resource stack managed by a resource stack provider from a resource stack template that integrates a custom resource from a second provider into the resource stack using a notification system with the second provider. For example, a resource stack provider may provide tools to create a collection of interdependent resources that form a resource stack. The resource stack provider may have a catalog of resources that it manages that can be included in the resource stack. Other resources, including those not managed by the resource stack provider, may be still be included in the catalog for use in a resource stack as a custom resource even though the custom resource is managed by the custom resource provider. This allows for resources that do not conform to internal requirements of the resource stack provider to be included in resource stacks. The custom resource provider may provide template, integration, configuration and/or communication information to the resource stack provider to use in communicating requests for creating, reading, updating and destroying custom resources as part of a resource stack. The proper construction of a template may be described in documentation provided to users that construct templates to build a resource stack.

In one embodiment, a customer may create, select or otherwise specify a template that defines a resource stack. The resource stack may comprise resources available from the resource stack provider and one or more custom resources provided by a second provider. The template may also provide information about linking the resources in the resource stack together, including the custom resource, and configuring the resources. When a resource stack is created, the resource stack template may be followed. Dependencies between resources may be determined and an ordering of instantiation of the resources determined. Resources available from the resource stack provider may be provisioned. Custom resources may be initialized by notifying the provider of the custom resource of the requested integration of the custom resource with the resource stack and requested configuration details. The custom resource provider may respond with an indication of successful integration when the custom resource has been successfully initialized. After successful provisioning and integration of the resources and custom resources in the resource stack, the resource stack may be enabled for use. An advantage of this resource stack that integrates custom resources is that resources managed by other systems may be integrated into the resource stack. This may allow a resource stack to integrate IaaS, PaaS and SaaS solutions from other providers that may not be available through the provider or that may be preferable to solutions from a provider of the resource stack.

The initialization of the custom resource may be performed by a provider of the custom resource in response to a notification from the resource stack provider. The notification may include or otherwise reference information that enables the provider of the custom resource to integrate the custom resource into the resource stack. In one embodiment, the resource stack provider constructs a message that comprises an independent portion and a payload. The independent portion may be custom resource independent and include information about the resource stack and/or template. The payload may include information specific to the configuration of the custom resource. The provider of the custom resource may then use the information from the notification to initialize the custom resource for use with a resource stack associated with the notification. The custom resource provider may then provide an indication of successful integration with the resource stack to the resource stack provider. In an embodiment, this indication may include a success/fail identifier, a custom resource identifier for use when interacting with the custom resource and additional information specific to the custom resource, such as default settings. In some embodiments, the indication is returned via a return message. In other embodiments, the indication is returned by placing the response in a storage location. In one embodiment, a messaging service is used in which the protocol may be selected by the message receiver.

For example, a web application template may include a webserver, database and external electronic mail service. The template may specify one or more dependencies between the webserver, database and external main service. For instance, one specified dependency may require that the database and external electronic mail service must be active before the webserver is running. The stack management system may receive a request to create a resource stack. Using the template, a stack management system may cause a workflow to be created that provisions resources of the resource stack while respecting any dependencies specified by the template. A workflow processing system of the stack management system may execute the workflow and cause the database to be provisioned before other resources of the resource stack. The workflow processing system may then notify a management system of the external electronic mail service that integration of the electronic mail service with the resource stack is requested. The management system of the external electronic mail service may, in response to being notified of the need to integrate the external electronic mail service with the resource stack, initialize the external electronic mail service to integrate with the resource stack. Upon successful initialization of the external electronic mail service, the management system of the external electronic mail service may then return an indication of successful integration of the electronic mail service with the resource stack. This return may include further information useful to the webserver to use the external electronic mail service, such as authentication credentials necessary for the external electronic mail service to operate properly in the network stack.

After the database and external electronic mail service are provisioned, initialized and/or configured, the webserver may be provisioned. The workflow processing system may cause the webserver, which may be implemented as a virtual computer system, to be provisioned using a machine image and configuration that allows the webserver to use the resources in the resource stack. The machine image may be a set of data used to instantiate a virtual computer system with a particular operating system. In some embodiments, the machine image may be accessed from a durable data storage service and provided to a block data storage device service that is operably connected over a network to a computing resource service (e.g., program execution service) to enable a hardware host to utilize the machine image to activate and operate as a virtual computer system. Once the webserver is active, the workflow processing system, in this example, may enable the resource stack for use. Enabling the resource stack for use may include reconfiguring one or more internal systems to provide programmatic control of the resource stack to the entity for whom the resource stack was provisioned.

In some embodiments, the independent portion of the message transmitted for notification includes a stack identifier, logical resource identifier, unique identifier, namespace and context information. The stack identifier may provide a value that can be used to reference the resource stack. The logical resource identifier may be an identifier that refers to the custom resource in the template. A unique identifier may uniquely identify the message so that duplicate messages may be discarded. A namespace may define the bounds of identifiers to allow for disambiguation of similar identifiers. The context information may provide information about the resource stack construction, such as identifiers. In one embodiment, the context includes unique identifiers and/or configurations of resources present in the stack so that a custom resource may refer to specific resources in the stack when in communication with resources in the stack.

As discussed, dependencies in the resource template may be respected while provisioning resources of a resource stack. Dependencies and may be explicit or implicit. An explicit dependency may be specified by the template. For example, an explicit dependency may be defined by the template as a first resource that must have a second resource active before the first resource may be constructed. Definition of a dependency in a template may itself be explicit and/or may be implicit, for example, by relative positions of resources in a schema of the template. In another example, an explicit dependency may be shown through a linear ordering of construction of resources or a directed acyclic graph (DAG). An implicit dependency may not be described in the template, but determined from other sources. In some embodiments, an external rule set is given that determines implicit dependencies. In other embodiments, connections between resources and/or configuration information may be used to determine implicit dependencies.

Custom resource definitions for use in a template may be created by a provider of a custom resource and used by a customer to integrate the custom resource in a resource stack definition in a template defining the resource stack. In one embodiment, a provider of a custom resource defines valid information about a custom resource that may be used to populate a template. The provider may also provide a generator that constructs a notification and/or payload in a notification to the provider that may be used in conjunction with the template and the custom resource. A generator may be a programming module implemented on a computer system that is configured to translate a custom resource definition in a template into at least a payload based at least in part on the template and/or resource stack implementation details. The provider may also provide a configurator that consumes a response from the provider in response to the notification and provides configuration and/or modifications to resources in the resource stack to integrate the custom resource. A configurator may be a programming module implemented on a computer system that is executed in response to a response from a custom resource provider to finish integration of the custom resource with other resources.

In some embodiments, the resource stack provider and the custom resource provider are sub-entities of a service provider. For example, a service provider includes a resource stack provider that manages provisioning of databases, virtual machines and storage devices. The service provider may also include services that are not managed by the resource stack provider, but can be integrated through a custom resource such as search functionality, electronic mail, log publishing and monitoring services. In one embodiment, the resource stack provider manages a selection of resources and provides a custom resource construct for managed resources that already have management functionality. For example, the resource stack provider may provide infrastructure, such as virtual machines and storage, while allowing a custom resource construct for services, such as electronic mail and search services. The services may actually be constructed of a separate resource stack that is managed by a provider different than the stack management system.

Techniques described and suggested herein also provide ways by which a resource stack can be used to create, read, update and destroy resources together, including a custom resource. In one embodiment, a user may choose to upgrade components of a resource stack while keeping others. For example, a user may choose to upgrade a virtual machine instance of a particular type to a virtual machine instance that is more capable in one or more regards, such as a virtual machine instance with more computing power. The user may modify the original stack template to include the more capable instance or use a user interface to select the more capable instance and request the change. In response, the more capable instance may be provisioned. Settings of the resource stack that relied on the virtual machine instance may be changed to use new settings of the more capable instance, such as hostname and/or Internet Protocol (IP) address. In another embodiment, a custom resource may be modified and settings updated to match the updated custom resource. For example, a template may be modified to select additional monitoring services from a custom resource or a user may select the additional monitoring services from a user interface, such as a web browser. A notification may be sent to the provider of the monitoring services with information about the requested modification. An indication of successful integration with the resource stack may be returned. Information included with the indication may be used to further configure and/or modify other resources in the resource stack to integrate the change. After the modification has been successfully integrated, the resource stack may be used with the modifications.

In one embodiment, use of the custom resource may cause a cost to accrue to an account of a customer. The cost may be applied to an account related to the custom resource or an account related to the stack management system. In one embodiment, a unified billing may be imposed where a provider of a custom resource informs a provider of the resource stack about usage of a custom resource. The customer may pay a unified bill received from the resource stack provider which may then pay the provider of the custom resource. In some embodiments, a custom resource provider may receive a percentage of usage fees for use of the resource stack.

The term provisioning is meant to be read broadly to include the assignment of a computing resource to a use. In some embodiments, this includes preparing the computing resource for use. In one embodiment, a provisioning of a resource would include the assignment of a server, installation of an operating system, installation and configuration of the software to be placed on the resource and enabling the constructed resource for use. For example, a provisioning system may select a server to use as a webserver. The provisioning system may then create a workflow that prepares the server for use as a web server. As part of the workflow, a machine image may be loaded on the server. The machine image may include operation system, web hosting software and/or settings. After loading the machine image, the server may be caused to boot into the operating system and receive any further software and/or settings. Such settings may include a domain name and/or website and security configuration. After provisioning is complete, the server may be turned over to a management system for use as a webserver and inclusion in the resource stack.

Turning now to FIG. 1, an illustrative example of a system 100 with a resource stack 102 in accordance with at least one embodiment is shown. A user may create a template 104 to define a resource stack 102 to automate creation of a system, such as a system supporting a web application. The template 104 may define resources, connections, properties, dependencies, identification and/or settings of resources 104, 106 and 108 of a resource stack 102. The template 104 may also define links between resources defined in the template 104. Linking may include configuring resources of a resource stack to communicate with one another over a network, transmit requests, receive responses and otherwise interoperate. The template may define connections of the resource stack, such as a network topology for use with the resource stack that defines connectivity and/or communication paths available to resources within the resource stack. When used herein, a connection may be viewed as a communication path between two or more resources. The template 104 may be submitted to a stack management system 110 to create the resource stack 102 as defined in the template 104. The stack management system 110 may parse the template 104 and determine an order of construction of the resources 104, 106 and 108 in the resource stack 102. The stack management system 110 may communicate with a provisioning system 111 to managing provisioning of the resource stack 102. The provisioning system 111 may request a resource provisioning system 112 provision resources 104 and 108 that are managed by the provider of the stack management system 110. Custom resource 106 may be initialized by requesting the initialization of the custom resource 106 from a custom resource manager 116 through notification through custom resource messaging 114. The notification may include information necessary to integrate custom resource 106 into the resource stack 102, including any connections with resources 104 and 108. The custom resource manager 116 may then return an indication of successful integration back through custom resource messaging 114. The indication may include settings, including unique identifiers to identify the custom resources that may be applied by the stack management system to resources 104 and/or 108 in the resource stack 102. Examples of custom resources may include electronic mail services, website monitoring solutions, log polling services and other IaaS, PaaS or SaaS services.

As an illustrative example, a resource stack 102 may include an application server, database and search engine. The search engine may be a custom resource 106 that is managed outside of the responsibility of a provider of the stack management system 110. An example of such separation of management responsibility may include resources implemented on hardware hosted outside of the provider of the stack management system. Another example of separate management includes a service implemented on resources controlled by a same provider of the stack management system, but managed by an entity other than the provider of the stack management system. Yet another example of separate management includes a service implemented by the same provider of the stack management system, but managed as a separate entity to hide the complexity of the service from the user of the custom resource. The resource stack 102 may be defined by a template 104 that is created by a developer of the application. The definitions in the template of the application server and database may use terms and variables recognized by the stack management system 110. The definitions in the template of the search engine may include terms that define integration with the resource stack as recognized by the stack management system 110 and also terms and/or options recognized by a custom resource manager 116. A customer may request construction of the resource stack 102 using the template 104. The stack management system 110 may determine dependencies of the application server, database and search engine in the resource stack 102.

In order to respect the determined dependencies, the stack management system 110 may cause a provisioning system 111 to provision resources in an order according to dependencies when requesting the resource provisioning system 112 to construct resources. In the embodiment shown, the resource provisioning system 112 will first construct the application server and database. The provisioning system 111 may then compose a notification to a custom resource manager 116 that includes information about the resource stack 102 and configuration specific to the search engine. The configuration may be provided by a program, such as a configuration generator, that is provided to the provisioning system 111 by the provider of the custom resource. The configuration generator may be associated with a custom resource definition that is contained in the template and executed when the definition is encountered. The notification may be sent by a custom resource messaging system 114, protocol or other transmission to the custom resource manager 116. The custom resource manager may cause the search engine to integrate with the database and application server using the information provided in the notification. The custom resource manager 116 may then return an indication of success that may also include information about the search engine for use by and/or introduced into configurations of the resources in the resource stack 102. After instantiation and configuration of the resources in the resource stack 102, the resource stack 102 may be enabled for use.

The custom resource messaging 114 may be implemented in several different ways. In some embodiments, a notification service is used. A custom resource manager 116 may subscribe to a subject of a notification service relating to initialization requests of a custom resource. A notification service may allow a receiver create a subject (sometimes referred to as a topic, in some suitable messaging systems) to which other services may request publication. In some embodiments, the receiver may define the protocol used for receipt of published messages. For example, a custom resource manager 116 of an electronic mail service may create a subject of custom resource administration requests for the electronic mail service. The delivery of messages may be customized by the custom resource manager 116, including the protocol, such as hypertext transfer protocol (HTTP), file transfer protocol (FTP) or other protocols or combination of protocols suitable for the transmission of messages from one system to another. The notification service may then push messages to the custom resource manager 116 when received from the provisioning system 111. In one embodiment, a notification may be deposited on a storage device in a specified location. The recipient, such as the provisioning system 111 or custom resource manager 116, may periodically poll the location to determine if an action is required. In another embodiment, application programming interface (API) calls are used to pass the messages. The API interface may be standardized to simplify the complexity of supporting multiple APIs by the provisioning system 111. In some embodiments, a combination of the forgoing methods may be used. For example, a notification service may be used for the transmission of the notification and a response to the notification may be made by placing the response in storage. Communications between the provisioning system 111 and custom resource manager 116 may be secured. For example, verification of the messages may occur. Only notifications that are electronically signed by the provisioning system 111 with an electronic (e.g., digital) signature verifiable by the custom resource manager will be performed by the custom resource manager 116. Only responses signed by the custom resource manager may be accepted by the stack management system.

Modifying resources 104, 106 and 108 in the resource stack 102 may also occur while keeping the integration of the resource stack 102. For example, a database instance may be upgraded to a higher capacity database instance. The new database instance may be provisioned and data from the smaller database instance may be provided to the new database instance. Connections to the smaller database within the resource stack 102 may be modified to use the new database instance. Resources managed by the provisioning system 111 may be more directly modified. Custom resources 106 may be informed through a notification to the custom resource manager 116 that includes the modification information of the database. An indication of successful integration with the resource stack 102 may confirm the modifications were successfully applied to the custom resource 106.

In some embodiments, the resource stack 102 may be modified as a whole. In one embodiment, the template 104 defines options for scaling the resource stack 102. Using these options, a user may indicate which resources or all resources that may be scaled. The provisioning system 111 may cause the resource provisioning system 112 to modify resources managed by the provisioning system 111 and notify the custom resource manager 116 of changes to the resource stack 102 and requested scaling of the custom resource 106. In other embodiments, the resource stack may be operated on to form a copy, backup or even be deleted. During a copy operation, the resource provisioning system 112 copy computing resources according to processes in place for the management of the computing resources and reference the copies as part of metadata about the resource stack. The provisioning system 111 may then send a notification through custom resource messaging 114 to the custom resource manager 116 to form a copy of the custom resource 106. The custom resource manager 116 may return an indication of success along with a reference to the copy of the custom resource 114. The reference to the copy of the custom resource 114 may then be stored with the resource stack metadata. Reconstruction of the copy may use resource stack metadata to reference resources, including custom resources, in a request to reconstruct the copy. In another embodiment, the resource stack may be deleted as a whole. A request may be received that requests deletion of a resource stack matching a stack identifier. The provisioning system 111 may cause the resource provisioning system 112 to deprovision resources 104 and 108 managed by the provisioning system 111. Notifications to custom resource managers 116 may be sent requesting destruction or retirement of the custom resource 114. Indications of successful destruction or retirement may be returned to the stack management system 110 via the provisioning system 111. The success or failure may then be returned to the party that requested deletion of the stack.

For the purpose of illustration, templates are used throughout the present disclosure. It should be recognized, however, that other methods of creating resource stacks that do not necessarily use templates as described herein may be used. As one example, a customer of a computing resource provider may cause a stack to be created through an API call that provides instructions for creating the stack. In another embodiment, a message identifying a storage location that contains a representation of a resource stack contains the request to create a resource stack.

Figure 2:
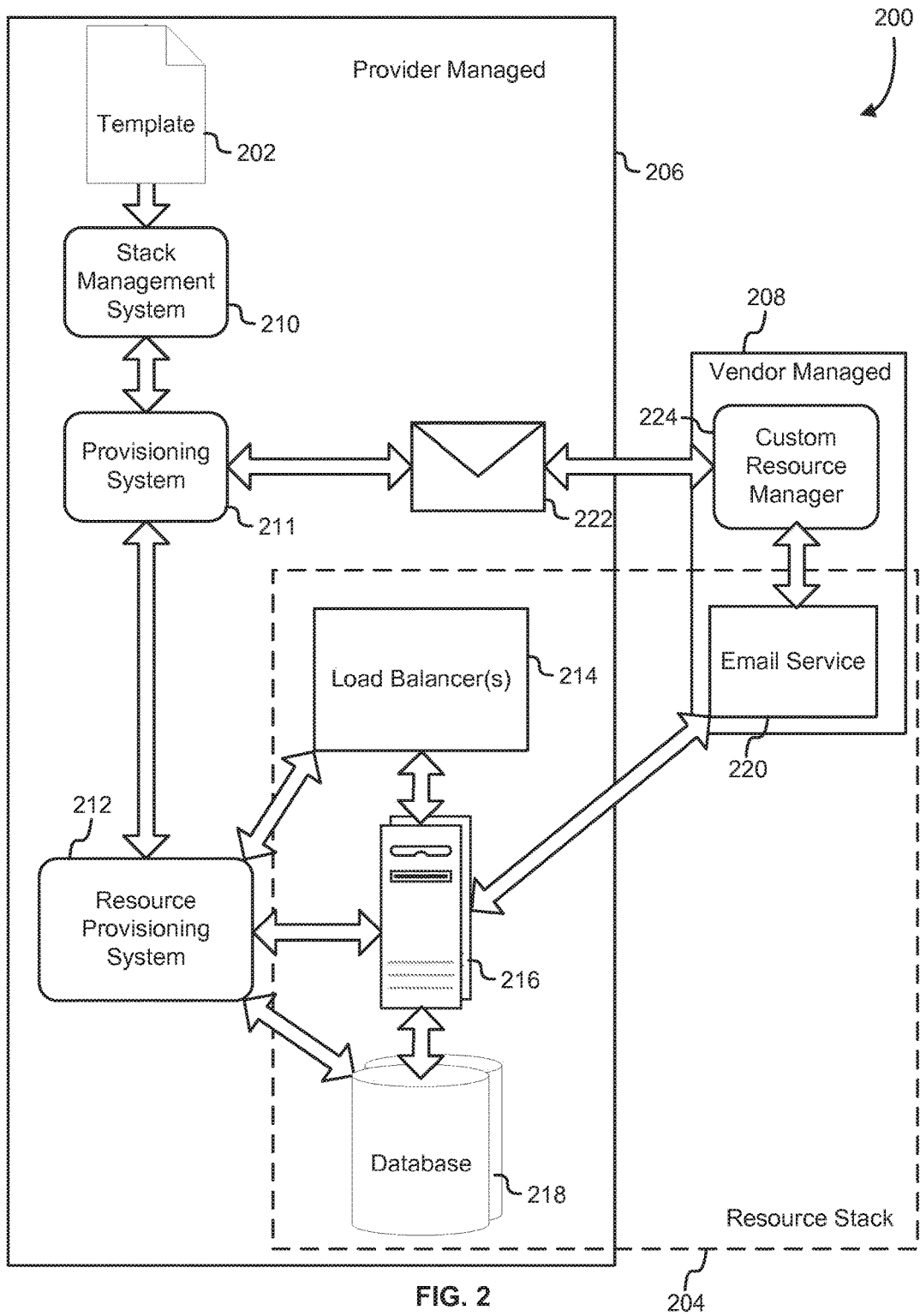
FIG. 2 shows an illustrative example of a system with a resource stack in accordance with at least one embodiment.

In an example of an implementation of FIG. 1, FIG. 2 shows a diagram representing a resource stack 204 that includes provider 206 managed resources of a load balancer 214, application servers 216 and databases 218. The resource stack 204, in this illustrative example, also includes an electronic mail service 220 managed by a vendor 208 external to the provider 206. A template 202 may define the resource stack 204 and connections between the resources 214, 216, 218 and 220. In the example shown, the application servers 216 are connected to the load balancers 214, databases 218 and electronic mail service 220. The template 202 may also define dependencies, such as the electronic mail service 220 and database 218 being initialized before the application servers 216 are initialized. The template 202 may also contain custom resource terms that cause a configuration generator to be executed and produce at least configuration information to send to the custom resource manager 224.

As a result of a request to create the resource stack 204, a stack management system 210 may determine dependencies and request a provisioning system 211 cause instantiation of resources 214, 216, 218 and 220 according to the dependencies determined. These dependencies may be represented by an ordering of instantiation and/or a directed acyclic graph with each node being a resource and each directed edge being a dependency. In the embodiment shown, the provisioning system 211 may cause the resource provisioning system 212 to provision the load balancers 214 and database 218 before the application server 216 because of dependencies. The stack management system 210 may also execute a configuration generator that provides configuration for the custom resource manager 224 based on the template 202 information and resource stack 204 configuration before requesting the provisioning system 211 to provision the application servers 216. The provisioning system 211 may then cause a notification to be sent to the custom resource manager 224 of the electronic mail service 220 that includes the configuration information generated. The custom resource manager may then integrate the electronic mail service 220 with the resource stack 204, and more specifically prepare the electronic mail service 220 for connection to the application server 216 such as by providing access credentials. The custom resource manager 224 may return an indication of success, such as a message, that includes configuration and other information, such as the access credentials, that may be used to configure the application servers 216. After the dependencies have been satisfied, the provisioning system 211 may then cause the resource provisioning system 212 to provision the application servers 216. The provisioning system 211 may further include configuration from the load balancers 214, databases 218 and electronic mail service 220 in a request to the resource provisioning system 212 to prepare the application servers for operation in the resource stack. After finishing the creation of the resource stack, the resource stack may be enabled for service. In one embodiment, should any resource fail to instantiate or cause stack creation to exceed a timeout period, the stack may be considered to fail and a reason for failure returned. In some embodiments, all successfully instantiated resources further processed to be destroyed.

Because the stack management system 210 and/or provisioning system 211 contains information about each of the resources 214, 216, 218 and 220, requested modifications to the resource stack 204 may be relayed to the resources 214, 216, 218 and 220. For example, information about additional application servers 216 may be relayed by the provisioning system 211 to the load balancers 214 to use as an option for load balancing. The additions to the application servers 216 may also be reported to the electronic mail service 220 through a notification 222, such that the electronic mail service 220 operates according to connections from the additions being authorized. The information to relay upon modification may be defined in the template, intrinsic to the provider, defined by the vendor that operates the custom resource or otherwise provided to the stack management system 210 and/or provisioning system 211.

Figure 3:
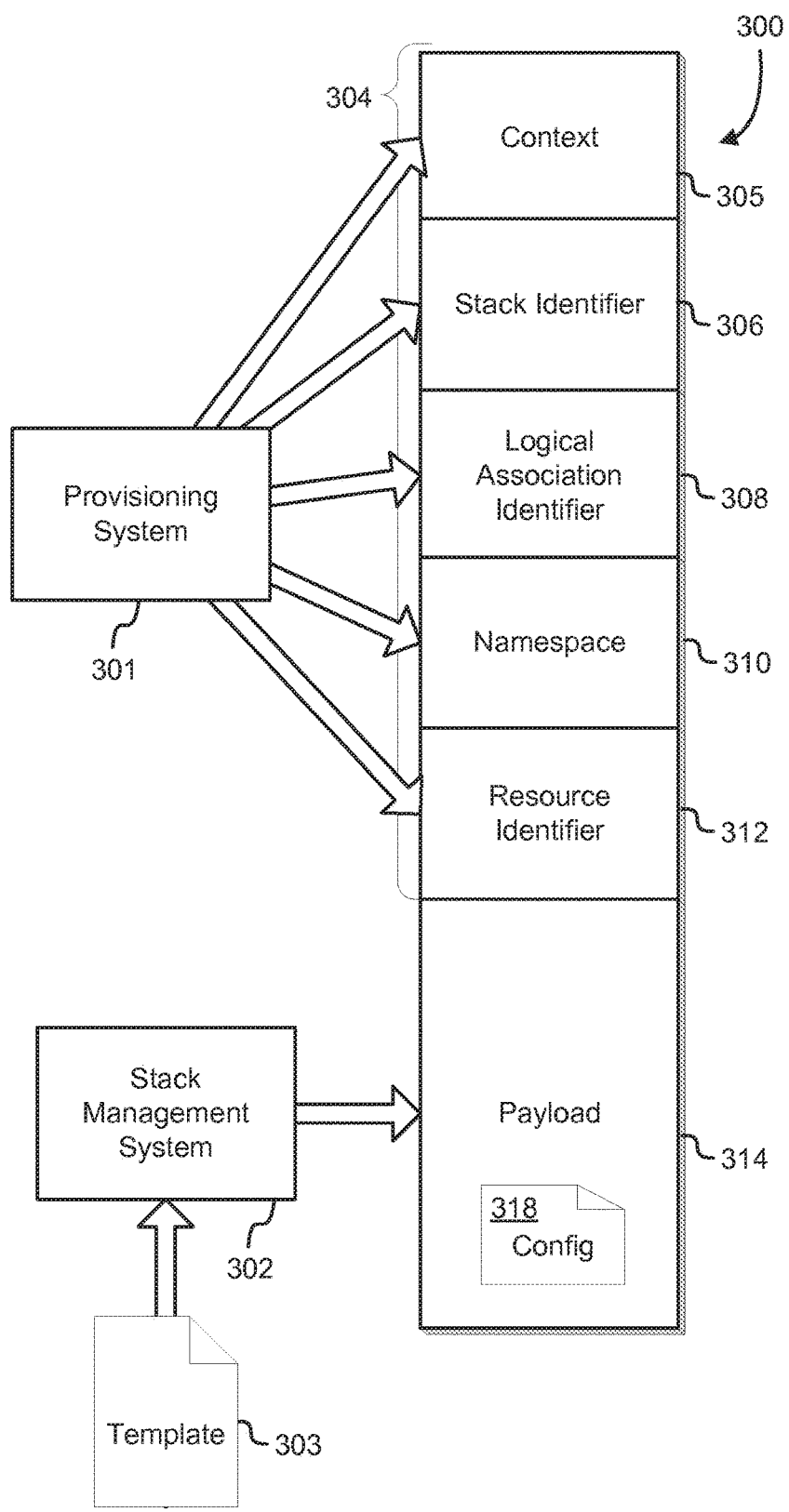
FIG. 3 shows an illustrative example of a message in accordance with at least one embodiment.

Turning now to FIG. 3, an illustrative example of a message 300 in accordance with at least one embodiment is shown. The message may be transmitted from a provisioning system 211 of FIG. 2 to a custom resource manager 224, as a result of the stack management system 210 encountering a definition of a custom resource in a template and requesting the provisioning system 211 construct the custom resource. The provisioning system 211 of FIG. 2 may send notifications 222 such as this message 300 shown in FIG. 3 to a custom resource manager 224. The message 300 may include a resource independent portion 304 and a payload 314 directed to information specific to the custom resource. The resource independent portion 304 may include information about the resource stack and the properties of the custom resource in the resource stack. In the embodiment shown, a provisioning system 301 builds the resource independent portion 304 of the message that comprises a context 305, stack identifier 306, logical association identifier 308, namespace 310 and resource identifier 312. A context 305, such as a unique identifier, may uniquely identify the message so that duplicate and/or prior messages may be discarded. The context 305 may also provide information about the resource stack construction. The stack identifier 306 may provide a value that can be used to reference the resource stack. The logical association identifier 308 may be an identifier that refers to the custom resource used in the template that triggered the creation of this message 300. A namespace 310 may define the bounds of identifiers to allow for disambiguation of similar identifiers. The resource identifier 312 may provide the provisioning system's 301 reference to the custom resource being addressed.

The message 300 may also include a payload 314. The stack management system may treat the payload 314 as an information blob (i.e., arbitrary information) that should be attached to the message 300 without the stack management system operating on the information within the payload 314. In the embodiment shown, the payload may be defined by the template 303 as processed through the stack management system 302 to be included in the message 300. Processing the template 303 through the stack management system 302 provides an indication of the template 303 to a custom resource manager. In another embodiment, the payload may be constructed by a configuration generator that is registered with a parsing system that parses the template 303 and gives the resulting payload to the stack management system 302 for inclusion in the payload 314. The parsing system may parse the template into tokens, such as definitions, that may be used to construct, configure and otherwise operate upon resources in the resource stack. Upon parsing a custom resource term, the parsing system may pass the configuration generator information from the template 303 and/or resource stack information to complete the configuration. The configuration generator may then generate the payload 314 to be attached to the message 300. This payload 314 may contain configuration 318 specific to the custom resource that may not be contained in the resource independent portion 304 of the message 300. For example, the electronic mail service in FIG. 2 may be provided configuration 318 in a payload that defines domains, name servers and individual electronic mail addresses.

Figure 4:
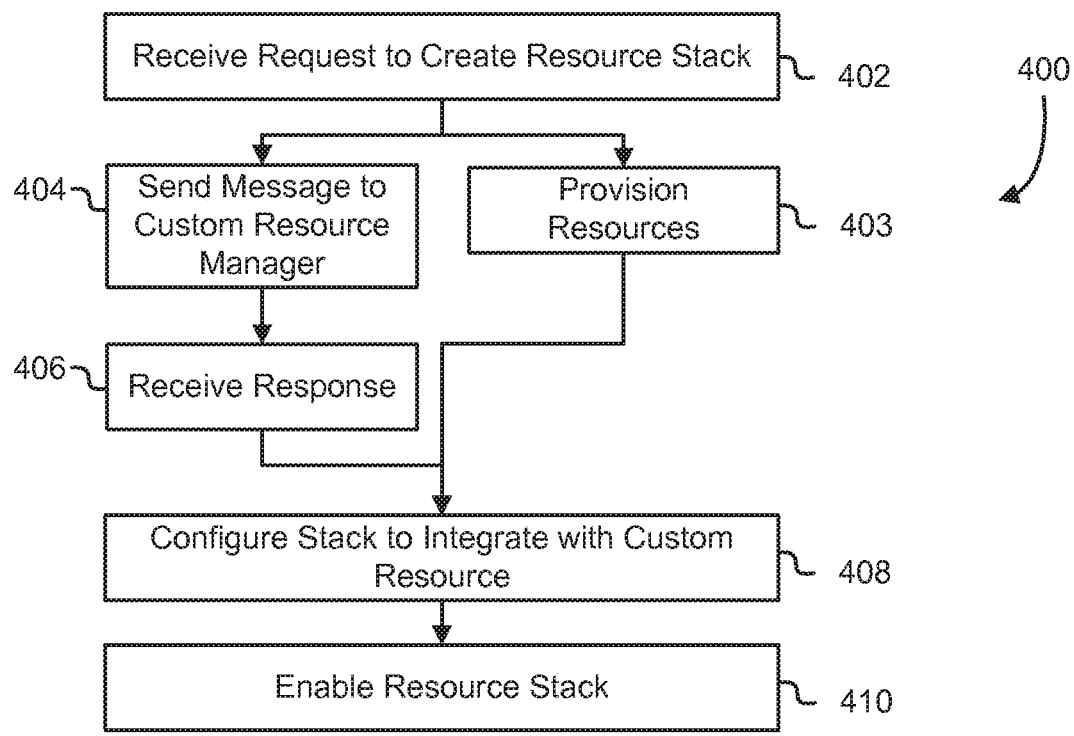
FIG. 4 shows an illustrative example of a process that may be used in accordance with at least one embodiment.

Turning now to FIG. 4, an illustrative example of a process 400 that may be used in accordance with at least one embodiment is shown. The process may be accomplished by any suitable system, such as collectively by systems described above in connection with FIG. 1, including a stack management system 110, custom resource manager 116, provisioning system 111, resource stack 102, resources 104 and 108 and custom resource 106. A stack management system may receive 402 a request to create a resource stack. For example, a developer may give access to a template defining a resource stack to a tester for purpose of testing a new version of a web application. The tester may request that the resource stack be created in a testing environment in a program execution service, such that testing of the new version may be accomplished. The program execution service may determine whether the template request is authorized, and if so, provide the request to the stack management system.

As illustrated, the stack management system may, in parallel, provision 403 resources under its control and send 404 a message to a custom resource manager to initialize custom resources not under the control of the stack management system. It should be noted, however, that provisioning 403 the resources and sending 404 the message may be performed in sequence and not necessarily in parallel. The stack management system may receive a response 406 as a result of sending the message. The response may indicate successful initialization of the custom resource and provide information about the custom resource, such as an identifier and/or credentials recognized by the custom resource manager. In some embodiments, a custom resource may be eventually consistent and therefore an indication of success may be different than an indication that the custom resource is ready to use. For example, eventually consistent storage may acknowledge a request for storage as an indication of success, but the storage may not be made available until later. Using the response and the resources, the stack management system may configure 408 resources in the resource stack to integrate with the custom resource. After the integration, the resource stack may be enabled 410. In some embodiments, an enabled resource stack may be immediately used. In another embodiment, an enabled resource stack is made available for customization, but is not activated for its intended use.

As an illustrative example of an embodiment of the process 400, the stack management system may receive a request to create a stack with a webserver connected to an offsite backup service that stores daily incremental backups. The stack management system may provision the webserver and send a message to the offsite backup service to request initialization of a location for daily incremental backups of the webserver. In one embodiment, a location may be a URL that is used to access a storage area provided for the backups. The offsite backup service may return a response identifying a location configured to receive daily incremental backups for the webserver and information used to secure the connection with the offsite backup service. In one embodiment, the information used to secure the connection may be credentials used in encrypting the connection to the offsite backup service. The stack management system may then use the location information to configure the webserver for daily incremental backups. After configuration of the resource stack is complete, the resource stack containing the web server and backup service may be enabled for the user to customize or make live.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 5:
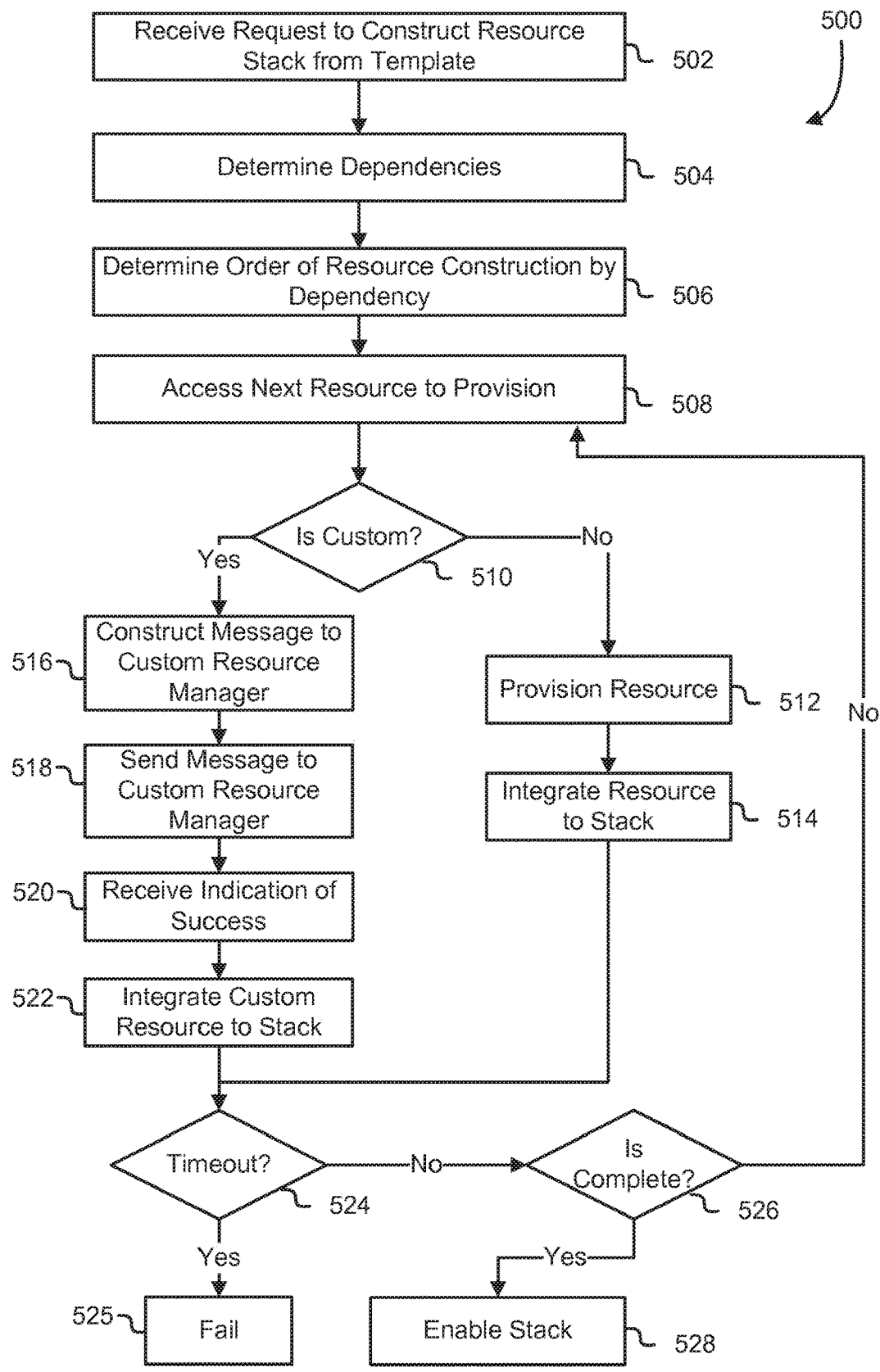
FIG. 5 shows an illustrative example of a process that may be used in accordance with at least one embodiment.

FIG. 5 shows an illustrative example of a process 500 that may be used in managing a resource stack that contains a custom resource. The process 500 may be a variation of the process 400, discussed above. Further, the process may be accomplished by any suitable system, such as collectively by systems described above in connection with FIG. 1, including a stack management system 110, custom resource manager 116, provisioning system 111, resource stack 102, resources 104 and 108 and custom resource 106. The stack management system may receive 502 a request to construct a resource stack from a template that describes the resources in the resource stack. For example, a developer may give access to a template defining a resource stack to a tester for purpose of testing a new version of a web application. The tester may request that the resource stack be created in a testing environment in a program execution service, such that testing of the new version may be accomplished. The program execution service may determine whether the template request is authorized, and if so, provide the request to the stack management system. The stack management system may determine 504 dependencies between resources in the resource stack. As discussed above, determining dependencies may be determined in various ways, including declarations of dependency, determinations of dependency by a stack management system, default rules or other implicit or explicit definitions of resource dependency.

Using the determined dependencies, the stack management system, in an embodiment, determines 506 an order of construction of resources defined in the template. Starting at the first resource in the determined order, the stack management system accesses 508 the next resource from the template to examine. Examining the next resource from the template to example may include making 510 a determination whether the resource is a custom resource. If it is determined 510 that the resource is not a custom resource 510, but is managed by the stack management system, the resource is provisioned 512 and integrated 514 into the stack, such as by configuring connections to other resources as defined by the template. Performance of the process 500 may include determining 524 whether construction of the resource has exceeded a predetermined amount of time (a "timeout"). A timeout may be measured by a timer. In some embodiments the timeout is global and applied to the resource stack as a whole. In other embodiments, each resource in the resource stack is given an individual timeout. If it is determined 524 that the timeout is exceeded 524, such as a timeout between 1 to 10 hours or more specifically 4 hours, the creation of the stack may be caused to fail 525. In instances of failure, in an embodiment, instantiated resources managed by the stack management system may be destroyed. Destroying a resource may include deprovisioning the resource such that the infrastructure supporting the resource may be returned to a pool of available infrastructure. Instantiated custom resources may also be destroyed by sending the management system of the instantiated custom resource a notification to destroy the custom resource. In some embodiments, the notification to destroy will not be sent without user intervention because destruction of a custom resource may result in destruction of data. This reaction to failure may be controlled by template information, user settings and/or defaults set by a provider of the custom resource. If the timeout is not exceeded 524 and the creation of the stack is complete 526, the stack may be enabled 528 for use. If determined 524 that the construction of the resource stack has not exceeded a timeout, a determination may be made 526 whether construction of the resource stack is complete. If it is determined 526 that construction of the resource stack is not complete, the next resource may be examined 508 and the process 500 may proceed as described above.

However, if it is determined 510 that the resource is not custom, the stack management system may construct 516 a message to the custom resource manager based on the template information, resource stack information and other information provided by the user and/or provider of the custom resource. The message may then be sent 518 to the custom resource manager according to an agreed-upon messaging system or protocol. The stack management system may then receive 520 an indication of successful integration with the resource stack by the custom resource manager. For example, the indication may be sent by message, API call, deposit at a storage location or other communication with a stack management system. While not illustrated, it should be recognized that an indication of failure may also be provided, if failure has occurred. Such failure may include an incorrect configuration sent to the custom resource manager, failure to create the custom resource and/or insufficient permission to create the custom resource. The process 500 may be adapted accordingly to process such failure. The stack management system may then perform 522 integration tasks to finish the integration of the custom resource. The cycle of resource instantiation from operations 508 to operation 524 may then repeat if the resource stack is not 526 completely instantiated and the timeout has not been exceeded 524. Otherwise, if the timeout has not been exceeded 524 and no more resources remain for instantiation 526, the stack may be enabled 528 for further use, such as deployment and/or personalization.

In some embodiments, a notification service is used for sending the message 518 and receiving 520 an indication of success. In one embodiment a notification service is used. A custom resource manager 116 may subscribe to a subject of a notification service relating to initialization requests of a custom resource. The delivery of messages may be customized by the custom resource manager 116, including the protocol, such as HTTP, FTP, electronic mail, SMS, a queue or other protocols. The notification service may then push messages to the custom resource manager 116 when received from the provisioning system 111. In another embodiment, a notification may be deposited on a storage device in a specified location. The recipient, such as the provisioning system 111 or custom resource manager 116 may poll the location to determine if an action is required.

In another embodiment, application programming interface (API) calls are used to pass the messages. The API interface may be standardized to simplify the complexity of supporting multiple APIs by the provisioning system 111. In other embodiments, a combination of the forgoing methods may be used. For example, a notification service may be used for the transmission of the notification and a response to the notification may be made by placing the response in storage. Verification of the messages may also occur. In one embodiment, only notifications signed by the provisioning system 111 will be performed by the custom resource manager.

Figure 6:
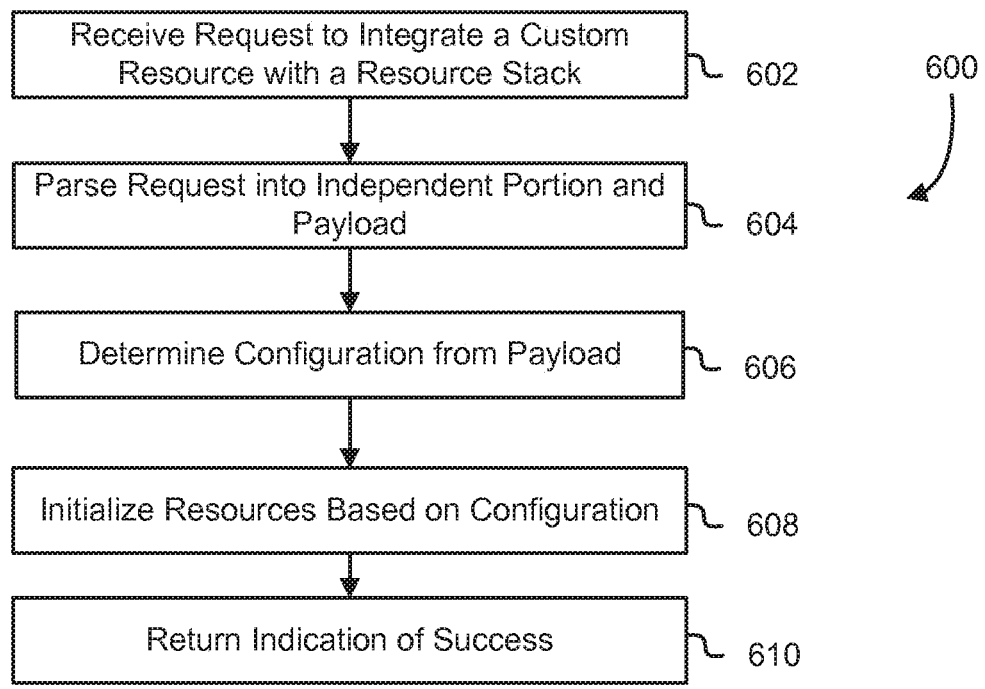
FIG. 6 shows an illustrative example of a process that may be used in accordance with at least one embodiment.

Turning now to FIG. 6, an illustrative example of a process 600 that may be used by a custom resource manager in accordance with at least one embodiment is shown. The process may be accomplished by systems shown in FIG. 1, including a stack management system 110, custom resource manager 116, provisioning system 111, resource stack 102, resources 104 and 108 and custom resource 106. The custom resource manager may receive 602 a request to integrate a custom resource provided with a resource stack. The custom resource manager may parse 604 the request into an independent portion and a payload. The custom resource manager may then use the payload to determine 606 a configuration of the custom resource to construct as part of the resource stack. In some embodiments, the independent portion may also be used, or exclusively used, to determine the configuration of the custom resource. Based at least in part on the determined configuration, the custom resource manager may initialize 608 the custom resource and configure the custom resource to integrate with the resource stack. For example, a custom resource may be provided by a vendor in a data center separate from a provider of the stack management system. Initialization of the custom resource may include provisioning the custom resource, setting up services, creating database entries, constructing credentials and otherwise preparing the custom resource for integration with the resource stack. In another example, a custom resource may be provided by a sub-entity of a provider of the stack management system. Initialization of the custom resource may include construction of a second resource stack under the management of the sub-entity. As the second resource stack is treated as a custom resource, the creation and management of the second resource stack may be transparent to a user of the custom resource in their resource stack.

If successful initiation of the custom resource is successful, the custom resource manager may return an indication of success and any additional information for the resource stack, such as a handle, physical source identifier and/or identification for the custom resource and other settings. For example, if the custom resource is a monitoring solution, the additional information may include alarms that have been created. In some embodiments, some or all of the independent portion is returned to identify to which resource stack the message belongs. In other embodiments, the additional information is returned for customer access rather than for the stack management system to access, as the customer may choose to self-configure. In one example, a custom resource may be a three dimensional printer and the configuration information may be a design. Upon receiving the notification, the three dimensional printer may construct the design. Upon completion of the design, the three dimensional printer may send an indication of successful construction of the custom resource. In another example, a custom resource may be a crowd-sourced resource, such as a resource based in human knowledge. A question may be posed to a group of people and the most common answer may be selected and returned as part of the indication of success.

The custom resource manager may also receive requests to modify the custom resource. The request may also be parsed and the requested modification determined. The custom resource may be modified according to the determined request and re-integrated back into the resource stack. In some embodiments, this re-integration may require reconfiguration, such as if a hostname, address or other identifying information has been changed and/or scaled to increase or decrease a number of contact points. Once the modifications have been integrated, the custom resource manager may return an indication of successful integration back to the stack management system.

As custom resource management is out of the control of the stack management system, failures of the custom resource may be handled in different manners. For example, a custom resource provider may refuse to respond because the provider's data center has been damaged. A timeout from the notification may protect the stack management system from waiting too long for an acknowledgement. The exceeded timeout may then be reported to a calling entity that had requested that the resource stack be built. In some embodiments, the calling entity may choose to react to a detected failure. In one embodiment, a failure during a resource stack operation may be reported to the calling entity. The calling entity may choose to react, such substitute a different template or custom resource in place of the current template or custom resource. In another embodiment, operational failure outside of the resource stack operations, such as create, read, update and destroy, may be detected and a response determined by other systems. In some embodiments, the response may include a request to modify the resource stack.

A resource stack provider may provide its catalog in a marketplace format. A customer may select resources managed by the provider and/or custom resources managed by the custom resource provider. In some embodiments, selections from the marketplace may be included in a template for a resource stack. In one embodiment, a custom resource provider may pay a one time or reoccurring fee to be included in a catalog of available resources to include in a resource stack. The provider may then receive costs accrued by use of the custom resource and or a fee for construction of the resource.

A template may define various aspects of the resource stack including identification of resources in the resource stack, properties of resources, parameters, interconnections between resources of the resource stack, connections outside the resource stack, configurations of the resource stack, setup operations to have resources perform and operations to have resources to perform. In one embodiment, the template may include hierarchal definitions of resources. For example, a template may begin with a definition of the resource stack that contains sub-definitions of resources, custom resources, operations to perform on or by resources and connections between resources. Each sub-definitions of resources may further contain sub-definitions including options, descriptions, parameters, connections, sub-resources or other relevant definitions applicable to the resource.

Figure 7:
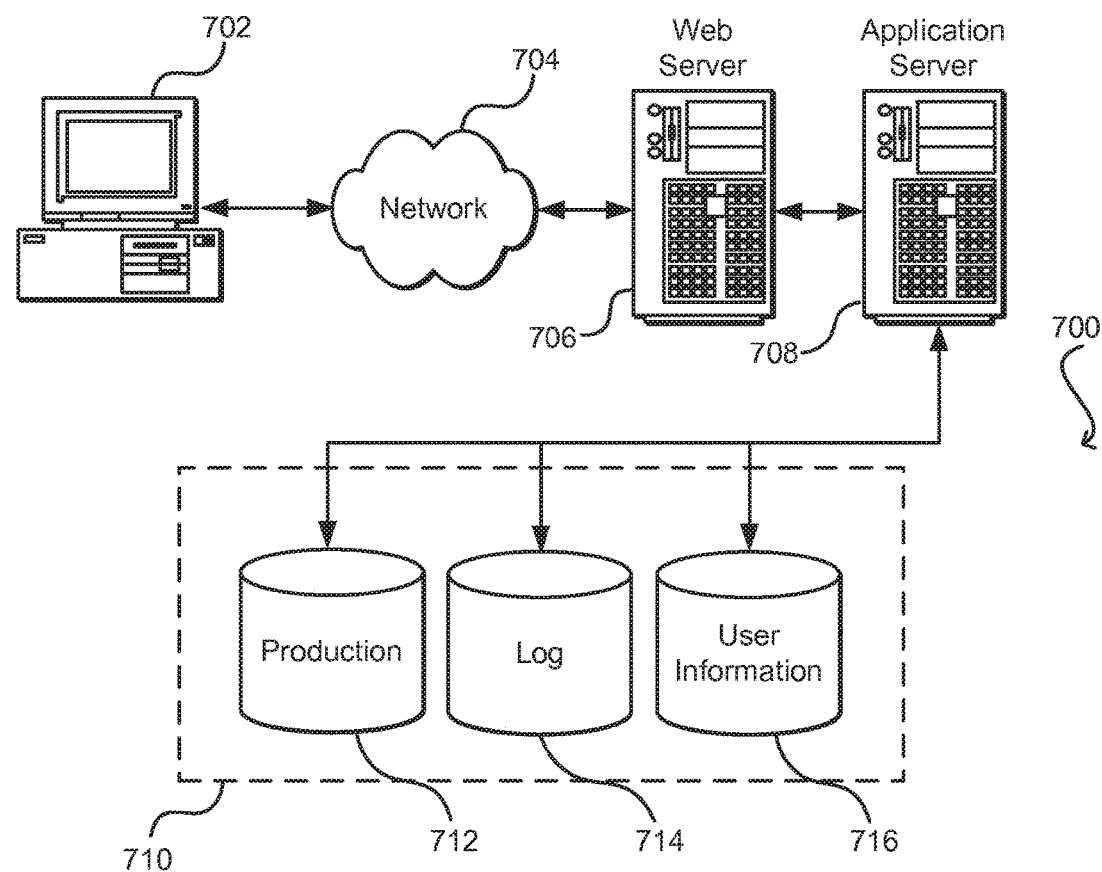
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer implemented method, comprising:
providing a catalog of resources comprising one or more resources offered by a provider service and one or more custom resources offered by another provider external to the provider service;
receiving a request to construct a configuration of one or more resources defined by a configuration template that specifies user-selected resources from the catalog of resources, wherein the user-selected resources comprise at least a computing resource selected from the one or more resources offered by the provider service and a custom resource offered by another provider external to the provider service;
in response to the request:
creating a configuration of one or more resources based at least in part on the configuration template;
communicating with the other provider to initialize the custom resource and integrate the custom resource and the computing resource based at least on the configuration template; and
provisioning the computing resource based at least in part on the configuration template.

2. The method of claim 1, further comprising: receiving, via a user interface provided by the provider service, a request to modify the configuration of the resources.

3. The method of claim 2, further comprising:
receiving, via the user interface, a user-modified version of the configuration template, wherein the user-modified configuration template; and
modifying the configuration of the one or more resources based at least in part on the user-modified configuration template.

4. The method of claim 2, wherein the requested modification comprises a requested modification to a configuration of the custom resource, the method further comprising sending, in response to the request, a modification notification to the other provider instructing the other provider to modify the custom resource.

5. The method of claim 2, further comprising:
receiving a response to the modification notification from the other provider comprising an indication of successful modification; and
enabling use of the modification to the configuration of the one or more resources.

6. The method of claim 1, further comprising: receiving, via a user interface provided by the provider system, user input selecting the configuration template from one or more templates provided by the provider system.

7. The method of claim 1, wherein the configuration template is user-created, the method further comprising: receiving, via a user interface provided by the provider system, the user-created configuration template.

8. A system, comprising:
one or more computing devices having one or more processors and memory including program instructions that, when executed by the one or more processors, cause the one or more processors to implement a provider computer system configured to:
provide a catalog of resources comprising one or more resources offered by a provider service and one or more custom resources offered by another provider external to the provider service;
receive a request to construct a configuration of one or more resources defined by a configuration template that specifies user-selected resources from the catalog of resources, wherein the user-selected resources comprise at least a computing resource selected from the one or more resources offered by the provider service and a custom resource offered by another provider external to the provider service;
in response to the request, the provider computer system is configured to:
create a configuration of one or more resources based at least in part on the configuration template;

communicate with the other provider to initialize the custom resource and integrate the custom resource and the computing resource based at least on the configuration template; and provision the computing resource based at least in part on the configuration template.

9. The system of claim 8, wherein the provider computer system is further configured to receive, via a user interface provided by the provider computer system, a request to modify the configuration of the resources.

10. The system of claim 9, wherein the provider computer system is further configured to:

receive, via the user interface, a user-modified version of the configuration template, wherein the user-modified configuration template; and modify the configuration of the one or more resources based at least in part on the user-modified configuration template.

11. The system of claim 9, wherein the requested modification comprises a requested modification to a configuration of the custom resource, wherein provider computer system is further configured to send, in response to the request, a modification notification to the other provider instructing the other provider to modify the custom resource.

12. The system of claim 9, wherein provider computer system is further configured to:

receive a response to the modification notification from the other provider comprising an indication of successful modification; and enable use of the modification to the configuration of the one or more resources.

13. The system of claim 8, wherein provider computer system is further configured to: receive, via a user interface provided by the provider system, user input selecting the configuration template from one or more templates provided by the provider system.

14. The system of claim 8, wherein the configuration template is user-created and wherein the provider computer system is further configured to: receive, via a user interface provided by the provider system, the user-created configuration template.

15. A non-transitory computer-readable storage medium storing computer-executable instructions that are executed by one or more processors of a computer system to perform:

providing a catalog of resources comprising one or more resources offered by a provider service and one or more custom resources offered by another provider external to the provider service;

receiving a request to construct a configuration of one or more resources defined by a configuration template that specifies user-selected resources from the catalog of resources, wherein the user-selected resources comprise at least a computing resource selected from the one or more resources offered by the provider service and a custom resource offered by another provider external to the provider service;

in response to the request:

creating a configuration of one or more resources based at least in part on the configuration template;

communicating with the other provider to initialize the custom resource and integrate the custom resource and the computing resource based at least on the configuration template; and provisioning the computing resource based at least in part on the configuration template.

16. The non-transitory computer-readable storage medium of claim 15, wherein the computer-executable instructions further cause the one or more processors to perform:

receiving, via a user interface provided by the provider service, a request to modify the configuration of the resources.

17. The non-transitory computer-readable storage medium of claim 16, further comprising:

receiving, via the user interface, a user-modified version of the configuration template, wherein the user-modified configuration template; and modifying the configuration of the one or more resources based at least in part on the user-modified configuration template.

18. The non-transitory computer-readable storage medium of claim 16, wherein the requested modification comprises a requested modification to a configuration of the custom resource, the method further comprising sending, in response to the request, a modification notification to the other provider instructing the other provider to modify the custom resource.

19. The non-transitory computer-readable storage medium of claim 16, further comprising:

receiving a response to the modification notification from the other provider comprising an indication of successful modification; and enabling use of the modification to the configuration of the one or more resources.

20. The non-transitory computer-readable storage medium of claim 15, further comprising: receiving, via a user interface provided by the provider system, user input selecting the configuration template from one or more templates provided by the provider system.

21. The non-transitory computer-readable storage medium of claim 15, wherein the configuration template is user-created, the method further comprising: receiving, via a user interface provided by the provider system, the user-created configuration template.

* * * * *